Patented Dec. 24, 1946

2,413,122

UNITED STATES PATENT OFFICE 2,413,122

GREASES

Reuben A. Swenson, Whiting, Ind., assignor to Standard Oil Company, Chicago, Ill., a corporation of Indiana No Drawing. Application October 13, 1945, Serial No. 622,232

9 Claims. (Cl. 252—40)

The present invention relates to improvements in greases and to the method in preparing the same; and more particularly to improvements in the manufacture of greases of the type suitable for use on open bearings at high temperatures, for example, such greases commonly known as mill greases.

This application is a continuation-in-part of my co-pending application Serial No. 527,352 filed March 20, 1944.

Prior to the improved method described and claimed in my copending application, high temperature greases prepared from fats or fatty acids, such as tallow, rosin or rosin oil and caustic soda, were made by mixing all of the fat or fatty acid with at least one-half of the total mineral oil content of the grease and all of the alkali, such as sodium hydroxide. After the tallow had been completely saponified, the rosin or rosin oil was then added to effect a reaction between the excess alkali and rosin or rosin acids. The alkalinity of the final grease was then adjusted by adding, if necessary, additional caustic to the mixture. Finally, the remaining portion of the mineral oil was graded in and the grease filled. The prior art of preparing mill greases of this type is exemplified by Arveson Patent 1,882,721, October 18, 1932.

In my co-pending application referred to above, I describe an improvement in the manufacture of such greases by saponifying all of the fatty material and rosin acids in the presence of a portion of the mineral oil content of the grease, adjusting the alkalinity of the mixture and then grading in the remaining portion of the oil and filling at an elevated temperature. In this method of preparing the grease the caustic material is added in small increments, the mixture being heated to a temperature of about 250 to about 270° F., before the addition of each increment of caustic material. After all the caustic material has been added, the temperature of the mixture is raised from about 280° F. to about 400° F. and the grease filled.

I have now discovered certain modifications in the preparation of greases of this type which are improvements over the prior art methods exemplified by the aforementioned Arveson patent, and the method described in my co-pending application.

It is an object of the present invention to provide an improved method in the preparation of high temperature greases having a soap content of not more than about 20%. Another object of the invention is to provide an improved method of preparing a high temperature grease which eliminates excessive foaming and thereby makes possible increased batch sizes. Another object of the invention is to provide a much more facile and rapid method of preparing high temperature greases resulting in a superior product of a much lower soap content than is obtained by prior methods.

In accordance with the present invention, high temperature greases having an alkali metal soap content of from about 5% to about 20% are prepared in the following manner: All of the mineral oil, the non-drying fat or higher fatty acids, and rosin acids are mixed together and heated to a temperature of from about 250° F. to about 420° F., preferably at a temperature within the range of from about 360° F. to about 410° F. at which time the alkali material, preferably caustic soda in a 48° Baumé solution, is added to the mixture as rapidly as possible, while heating the mixture vigorously to facilitate the flashing out of substantially all of the water. After all of the caustic is added, heating within a temperature range of from about 375° F. to about 410° F. is continued and the batch filled when substantially free of foam. The time required to add the saponifying agent may vary from about 5 minutes to about 120 minutes, depending upon the batch size; the optimum time for a 1200 pound batch is about fifteen minutes.

In preparing greases in accordance with the present invention, it is essential that the final product has a small excess of free acidity, preferably in the range of from about 0.1% to about 1.5% and preferably 0.5% of free fatty acid. This excess acidity is suitably obtained by employing an amount of caustic material which is less than that required to completely saponify the fatty acids and rosin acids employed in the preparation of the grease. If necessary, the acidity adjustment can be made by adding the required amount of fatty acid to the over-alkaline product. If the grease is finished with an excess of alkali, it is necessary to fill at a higher temperature to liquefy the product, and a grease low in consistency and of poor quality is obtained. This is illustrated by the following data obtained on two batches of mill greases.

|  | Filling temperature | Titration value | Penetration at 77° F. |
|---|---|---|---|
| Batch A: | ° F. |  |  |
| Sample 1 | 380 | 0.98% acid | 49 |
| Sample 2 | 390 | 0.08% alkaline | 88 |
| Batch B: |  |  |  |
| Sample 1 | 390 | 0.45% acid | 50 |
| Sample 2 | 395 | 0.06% alkaline | 88 |

In preparing the improved mill type grease, rosin, rosin oil or other rosin acid-containing materials can be used. Suitable non-drying fats, or higher fatty acids, which can be employed are tallow, stearic acid, lard oil, cottonseed oil, oleostearin, acidless tallow oil, standard fatty acid or other fats or higher fatty acids. Fats and fatty acids of the foregoing type will be referred to hereinafter as "fatty material." The term "non-drying" as used herein includes those fats or fatty acids which possess non-drying as well as semi-drying properties. The term "higher fatty acids" as used herein means those fatty acids which normally form soap. The standard fatty acid which is well known in the grease-making trade, may comprise a mixture of about 40% animal fatty acids and about 60% cotton-seed fatty acids. This product has approximately the following specifications:

Titre _____ 32 to 39° C.
Color _____ 3 N. P. A. (maximum)
Fatty acids _____ 93% (minimum)
Moisture, impurities and
  unsaponifiable _____ 5% (maximum)

The hydrocarbon oil employed may be any viscous hydrocarbon oil having the desired flash and viscosity characteristics. Suitable hydrocarbon oils are mineral oils having Saybolt Universal viscosity of from about 80 seconds at 100° F. to about 250 seconds or more at 210° F. While I prefer to employ sodium hydroxide as the saponifying agent, I may use other alkali metal hydroxides such as potassium hydroxide or lithium hydroxide. Small amounts of lime soap can be used in combination with the alkali metal soaps to obtain certain desired properties. The ratio of lime soap to alkali metal soap should not, however, exceed about 1 part of lime soap to 10 parts of alkali metal soap.

Illustrative of greases prepared by my improved method and manufacture are the soda rosin greases of the mill grease type. These greases are generally prepared from the following ingredients in the following proportions to make a 100 pound batch of finished grease:

|  | Pounds |
|---|---|
| Fatty material | 6.0 to 8.6 |
| Rosin acid-containing material (calculated as rosin acids) | 5.0 to 10.1 |
| Dry caustic | 1.4 to 2.5 |
| Petroleum oil | 88.0 to 79.9 |

The following typical formulae are illustrative of the type mill grease which can be prepared by the method of the present invention:

|  | Grease A | Grease B |
|---|---|---|
| Rosin _____ pounds | 6.1 | 6.1 |
| Standard fatty acids _____ do | 5.1 | 5.1 |
| Dry caustic soda _____ do | 1.4 | 1.4 |
| Petroleum oil _____ do | ¹ 88.0 | ² 88.0 |
| Penetration at 77° F | 45 | 54 |
| Softening time test at 300° F | ³ 300 | ⁴ 300 |

¹ Saybolt Universal viscosity at 100° F.—425 to 450 seconds.
² Saybolt Universal viscosity at 210° F.—100 seconds.
³ No drop.
⁴ ¼ drop.

These greases were prepared by charging all of the rosin, standard fatty acid and oil to the mixer and heating the mixture to a temperature of about 360° F. at which time the caustic soda in a 48° Baumé solution was added in about fifteen minutes. The temperature of the batch was increased to about 370–385° F. and maintained at this temperature for about 15 minutes, or until there was substantially no foaming, and the grease then filled.

The softening time test referred to in the above tabulation is a method for determining the softening time of the grease, which is an index of quality from the service standpoint. In the softening time test, a cylinder of the grease ½ inch in diameter and about ⅝ inch long is heated by an oil or mercury bath to the desired test temperature, usually at 300° F., while being subjected to the weight of an 85 gram cylinder which provides a pressure on the grease comparable to the pressure to which the compound is subjected in actual operation. The results are reported in the time required to flatten the test cylinder of the grease ¼ inch under these conditions. Mill greases prepared according to the prior art methods, usually have a low softening time varying from about 80 seconds to about 200 seconds. As noted from the above data, mill greases prepared in accordance with the present invention have a substantially uniform softening time of a minimum of 300 seconds. High temperature greases prepared in accordance with the present invention are superior products of lower soap content and have lower rates of consumption and less tendency to carbonization. The method provides a much more rapid one than the methods heretofore employed, for example a batch of grease prepared in accordance with the present invention can be completed in a four hour cycle as compared to a 12 hour cycle for a batch of grease of equal size by the former methods.

While the present invention has been described by reference to representative compounds and has been illustrated by reference to specific examples thereof, the invention is not to be limited to the various named compounds or the specific examples, but includes within its scope such modifications that come within the spirit of its appended claims.

I claim:

1. The method of preparing a high temperature grease containing an alkali metal soap of a non-drying fatty material, an alkali metal rosin soap and oil and having a soap content of not more than about 20%, comprising mixing together the fatty material, the rosin acid-containing material and all of the hydrocarbon oil, heating the mixture to a temperature of from about 250° F. to about 420° F., rapidly adding to the heated mixture an alkali metal hydroxide and maintaining the temperature within the range of from about 375° F. to about 410° F. until substantially all foaming subsides, adjusting the free acidity of the finished product to contain from about 0.1% to about 1.5% free fatty acid, and then filling said grease.

2. The method of claim 1 in which the fatty material is standard fatty acid and the rosin acid-containing material is rosin oil.

3. The method of claim 1 in which the alkali metal hydroxide is sodium hydroxide.

4. The method of claim 1 in which the fatty material is tallow.

5. The method of preparing a high temperature grease having a soap content of not more than about 20% comprising heating a mixture comprising non-drying higher fatty acids, a rosin acid-containing material and all of the hydrocarbon oil to be used in the preparation of said grease to a temperature of from about 250° F. to about 420° F., rapidly adding to said heated mixture a saponifying agent comprising an alkali metal hydroxide, maintaining said mixture at a temperature of from about 375° F. to about 410° F. until substantially all foaming subsides, adjusting the acidity of the finished product to contain from about 0.1% to about 1.5% free fatty acid, and finally filling said grease.

6. The method described in claim 5 in which the higher fatty acid is tallow and the rosin acid-containing material is rosin.

7. The method described in claim 5 in which the higher fatty acid is tallow and the rosin acid-containing material is rosin oil.

8. The method of claim 5 in which the saponifying agent comprises substantially sodium hydroxide and a small amount of calcium hydroxide.

9. The method of preparing a high temperature grease containing the following ingredients in the following approximate proportions:

| | Pounds |
|---|---|
| Non-drying fatty material | 6 to 8.6 |
| Rosin acid-containing material (calculated as rosin acids) | 5 to 10.1 |
| Dry caustic | 1.4 to 2.5 |
| Petroleum oil | 88 to 77.9 | comprising mixing together the non-drying fatty material, rosin acid-containing material and all of the petroleum oil, heating said mixture to a temperature of from about 250° F. to about 420° F., rapidly adding the caustic in a 48° Baumé solution to said heated mixture, maintaining the mixture at a temperature of from about 375° F. to about 410° F. until substantially all foaming subsides, adjusting the acidity of said mixture to from about 0.1% to about 1.5% free fatty acid, and finally filling said grease.

REUBEN A. SWENSON.